United States Patent [19]

Christensen et al.

[11] 3,887,919

[45] June 3, 1975

[54] HIGH SPEED MICROWAVE SWITCHING LOGIC FOR ECCM

[75] Inventors: James L. Christensen, Beverly; Thomas B. Howard, Moorestown, both of N.J.

[73] Assignee: United States of America as represented by the Secretary of the Navy, Washington, D.C.

[22] Filed: Nov. 30, 1966

[21] Appl. No.: 598,114

[52] U.S. Cl. .............................. 343/18 E; 325/324
[51] Int. Cl. ............................................... G01s 7/36
[58] Field of Search .......... 343/17.1, 18 E; 325/322, 325/323, 324

[56] References Cited
UNITED STATES PATENTS

| | | |
|---|---|---|
| 3,140,446 | 7/1964 | Myers et al. .......................... 325/324 |
| 3,218,556 | 11/1965 | Chisholm .......................... 343/17.1 |

*Primary Examiner*—T. H. Tubbesing
*Attorney, Agent, or Firm*—R. S. Sciascia; G. Rubens; A. Branning

[57] ABSTRACT

A radar receiver to sense the instantaneous presence of a jamming signal which is passed through a guard band filter centered around the narrow microwave receiver band and after being sensed the jamming signal is itself utilized to momentarily isolate the receiver during the interval in which it is within the guard band by the enabling of a microwave switch.

6 Claims, 4 Drawing Figures

3,887,919

INVENTORS
JAMES L. CHRISTENSEN
THOMAS B. HOWARD

BY

ATTORNEY

HIGH SPEED MICROWAVE SWITCHING LOGIC FOR ECCM

The present invention relates to pulse radar receivers and more particularly to an improved radar receiver which effectively increases the electronic counter countermeasures capability of the radar receiver.

Narrow band radar receivers are particularly vulnerable to jammers having frequency modulation rates between 100 kilocycles and 1 megacycle. In this band, the jamming signal is especially effective in covering the complete time base of the receiver and cause receiver saturation thereby rendering the receiver inoperative.

The general purpose of the present invention is therefore to provide a radar receiver with a high speed switching device which will isolate the receiver from the jamming signal during its presence. To attain this, the present invention contemplates sensing the instantaneous presence of a jamming signal in a wide guard band centered around the narrow microwave receiver band and using this jamming signal to momentarily isolate the receiver during the interval in which the jamming signal is within the guard band.

An object of the invention is therefore to provide effective electronic counter countermeasures whereby jamming signals are prevented from entering the narrow band receiver circuitry.

Another object of the invention is to provide a high speed microwave switching circuit sensitive to the instantaneous presence of jamming signals within a wide broad band and momentarily isolating the receiver from the signals during their presence.

Other objects and many of the attendant advantages of this invention will be readily appreciated as the same becomes better understood by reference to the following detailed description when considered in connection with the accompanying drawing wherein.

Figure 1:
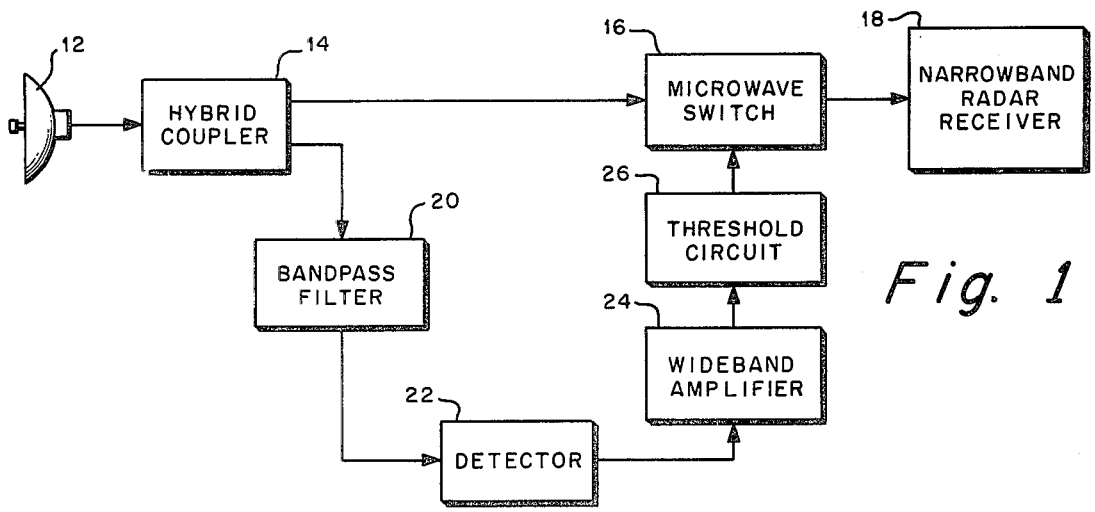
FIG. 1 illustrates an electrical block diagram of a receiver according to the present invention.

Referring now to the drawing, there is shown in FIG. 1 a radar antenna 12 for receiving radar return signals. The antenna is coupled to a hybrid coupler 14 for dividing the received signal into two paths. A first output from the coupler is connected to a fast microwave diode switch 16 which may, for example, provide a single-pole double-throw switching action. The function of the switch 16 is either to pass the signal from the hybrid coupler to a narrow band radar receiver 18 or to prevent its passage thereto and merely terminate the input to the receiver in its characteristic impedance. This function may be accomplished by connecting the center arm or common point of the switch to the input of the narrow band receiver 18 and one of the two poles connected to the hybrid coupler output and the other pole connected to a termination impedance. The microwave switch control circuitry will be discussed below.

A second output from the hybrid coupler 14 is connected to a bandpass filter 20 having a center frequency centered about the operating frequency of the narrow band radar receiver. The function of the filter is to pass signals within this bandpass without appreciable attenuation while providing considerable attenuation for signals outside this bandwidth. The output of the filter is then coupled to a detector circuit 22 which may, for example, be a simple crystal detector having the requisite bandwidth and sensitivity for the dynamic range of signals to be received by the antenna 12. The output of the detector is coupled to a wideband amplifier 24 for amplifying the unidirectional pulse from the detector to a level sufficient to actuate a threshold circuit 26. The threshold circuit 26 provides a control signal to the microwave switch 16 for preventing the return signal from the hybrid coupler 14 to pass through the switch to the narrow band receiver 18.

Figure 3A:
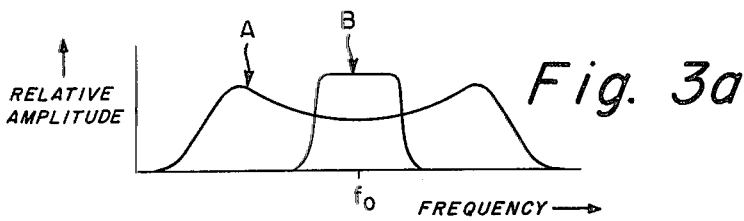
FIGS. 3a and 3b are typical amplitude vs. frequency curves associated with the embodiments of FIG. 1 and FIG. 2.
Figure 3B:
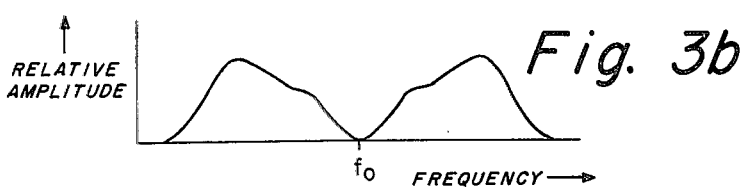

The operation of the device can best be understood by the following example. Assume that the bandpass filter 20 provides a guard band of 100 megacycles; that is, the filter has a bandwidth of 100 megacycles. Also assume that a jammer operating in the vicinity of the radar receiver is sweeping a 300 megacycle bandwidth at a 10 megacycle sweep rate. FIG. 3a, curve A, illustrates a typical jamming spectral envelope and curve B illustrates the 100 megacycle bandwidth of the bandpass filter 20. Consider the radar antenna 12 as receiving the jamming signal as it appears at some point within the guard band as established by the bandpass filter 20. The signal passing through the filter is detected by the detector 22 and amplified in amplifier 24. This signal is then applied to a threshold circuit 26 which, in the presence of the jamming signal, is exceeded. A control signal, provided by the threshold circuit 26 in response to the jamming signal, is applied to the microwave switch 16 and opens the normally closed path between the hybrid coupler 14 and the narrow band receiver 18 thereby preventing the jamming signal from entering the radar receiver. The input to the receiver will then have a jamming spectral envelope as illustrated in FIG. 3b.

The threshold circuit 26 may be adjusted or designed to open the diode switch 16 at any predetermined level. For example, experiments with swept frequency jammers have shown that the jamming signal must exceed the radar return signal by approximately 40 decibels to effectively jam the receiver. Therefore, a threshold level can easily be set which will distinguish between the jamming signal and the radar return signal thereby preventing the radar return signal from actuating the threshold switch.

An alternative technique for preventing the radar return signal from actuating the threshold circuit 26 is to provide the bandpass filter 20 with a notch characteristic at the center frequency of the radar receiver. For example, the filter could be designed to have maximum attenuation at the center frequency, $f_0$, of the radar thereby preventing return signals within the receiver bandwidth from ever reaching sufficient amplitude to trip the threshold circuit 26, but still permitting jamming signals to trip the threshold circuit.

It has been estimated that radar receivers must be protected against jamming signals as low as −70 dbm. Since this is well below the sensitivity of many crystal video detectors, it is necessary to provide a means for amplifying the jamming signal so that it may be used to momentarily isolate a receiver from the jamming signal. A technique for performing this and other functions is illustrated in FIG. 2.

Figure 2:
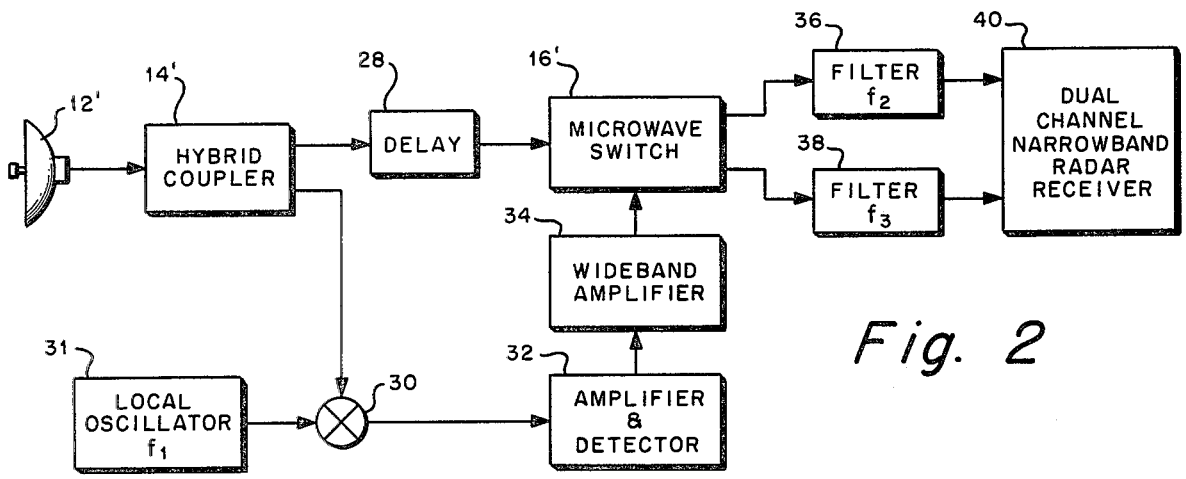
FIG. 2 is an electrical block diagram of an alternative embodiment of the invention.

Referring now to FIG. 2, there is illustrated a radar antenna 12′ coupled to a hybrid coupler 14′ for dividing received signals in a manner similar to that described with reference to FIG. 1. A first output of the hybrid coupler 14' is connected to a short delay device 28 for delaying the received signal a sufficient period of time to switch the conditions of a microwave switch 16', before the received signal is applied thereto.

A second output from the hybrid coupler 14' is connected to one input of a mixer 30. The other input is driven by a local oscillator 31 operating on a frequency of $f_1$. The output of the mixer is then an intermediate frequency equal to the difference between the signal from the hybrid coupler and that of the local oscillator. This signal is applied to an amplifier and detector circuit 32. The amplifier is preferably a bandpass amplifier having a bandwidth equal to the desired guard band. For example, the amplifier may have a 100 megacycle bandwidth similar to that of the bandpass filter 20. The output of the amplifier is detected in a manner similar to that described with reference to FIG. 1 and then applied to a wide band amplifier 34 for amplifying the detected signal and driving the microwave switch 16'.

The microwave switch 16' may be similar to that described with reference to FIG. 1; however, the center arm of the switch is connected to the output of the delay circuit 28 and one pole is connected to a filter 36 and the other to a filter 38. The filters 36 and 38 are preferably of the bandpass type with their characteristics centered about the operating frequencies of a dual channel narrow band radar receiver 40. The receiver 40 will normally, in the absence of jamming, receive signals through filter 36; however, during periods of jamming, the receiver will receive signals through filter 38 as will be described below.

Considering now the operation of the radar receiving system of FIG. 2, assume that a low level swept frequency jamming signal at a frequency of $f_2$, is received by the antenna 12' and coupled through the hybrid coupler 14' to the mixer 30. This signal is mixed with the local oscillator frequency $f_1$, the difference frequency amplified and detected and applied to the microwave switch 16'. Assume further that a transmitter operating in conjunction with the dual channel receiver 40 is transmitting two signals at frequencies $f_2$ and $f_3$. Then if the swept frequency jamming signal is within the bandpass of the amplifier 32 and is of sufficient amplitude to cause receiver jamming, it is also of sufficient amplitude to control the microwave switch 16'. The signal at the output of delay device 28 is then coupled to the narrow band receiver 40 through filter 38 rather than filter 36. In this way, the jamming signal will be attenuated by filter 38 and the signal appearing at a frequency of $f_3$ will pass unattenuated.

If, for example, the frequency difference between $f_2$ and $f_3$ is 100 megacycles, then in order for a swept frequency jammer to effectively jam the receiver system of FIG. 2, it must have a sweep rate of at least 100 megacycles, a value not readily achievable by most jammers. Accordingly, the receiving system provides effective counter countermeasures in a jamming environment.

The foregoing operational description assumed that the jamming signal was within the bandpass characteristics of the amplifier 32 after being mixed with the local oscillator frequency $f_1$. However, if the jamming signal is not within the bandpass characteristic, no signal will be applied to the microwave switch 16' and hence the signal issuing from the delay line 28 will be coupled directly to the receiver 40 through bandpass filter 36. Accordingly, the narrow band receiver is unmodified in the absence of a jamming signal and only in the presence of a jamming signal within the guard band or bandpass of the amplifier 32 will the microwave switch be energized and cause the received signal to be processed in a frequency channel unaffected by the swept frequency jammer.

The invention described herein accordingly provides an effective electronic counter countermeasures system in which high energy swept frequency jamming signals are prevented from rendering a radar receiver inoperative.

Obviously, many modifications and variations of the present invention are possible in the light of the above teachings. It is therefore to be understood that, within the scope of the appended claims, the invention may be practiced otherwise than as specifically described.

What is claimed is:

1. In a receiving system, an electronic counter countermeasures device for preventing a jamming signal from rendering a receiver inoperative, the device comprising:
    means providing a pair of signal paths for signals received by said system;
    means connected to a first of said paths for detecting the presence of a jamming signal therein and providing a control signal in response thereto;
    a delay device for delaying the signals received by said system;
    means connected to the second of said paths, said means being responsive to said control signal and including a microwave switch having an input and first and second outputs, said input for receiving the delayed signals from said delay device;
    first and second filters connected to said first and second outputs for preventing jamming signals from passing therethrough; and
    said microwave switch passing the delayed signals to said second filter only in the presence of said control signal.

2. A device as recited in claim 1 wherein the means connected to a first of said paths for detecting the presence of a jamming signal comprises:
    means for converting said signals received by said system to intermediate frequency signals; and
    means detecting said intermediate frequency signals and providing said control signal.

3. A device as recited in claim 2 wherein said means for converting comprises:
    a mixer having an input connected to receive signals from said first path; and
    a local oscillator for providing a signal to a second input of said mixer, whereby the output of said mixer is of an intermediate frequency.

4. A device as recited in claim 3 wherein said means detecting said intermediate frequency signals comprises:
    a bandpass amplifier for selectively amplifying signals within a guard band;
    a detector connected to the output of said amplifier for providing a detected output signal; and
    means providing said control signal when said intermediate frequency signals are within the guard band.

5. In a receiving system, an electronic counter countermeasure device for preventing a jamming signal from rendering a receiver inoperative, the device comprising:

means providing a pair of signal paths for signals received by said system;
   means connected to a first of said paths for detecting the presence of a jamming signal therein and providing a control signal in response thereto, said means including a mixer having an input connected to receive signals from said first path, a local oscillator for providing a signal to a second input of said mixer, whereby the output signals of said mixer are of an intermediate frequency, a bandpass amplifier for selectively amplifying signals within a guard band, a detector connected to the output of said amplifier for providing a detected output signal, and means providing said control signal when said intermediate frequency signals are within the guard band; and means connected to the second of said paths including a delay device
   for delaying the signals received by the system, a microwave switch having an input and first and second outputs, said input for receiving the delayed signals from said delay device, first and second filters connected to said first and second outputs for preventing jamming signals from passing therethrough, such that said microwave switch passes the delayed signals to said second filter only during the presence of said control signal.

6. A device as recited in claim 5 further comprising:
a dual channel narrow band receiver having first and second inputs connected to the outputs of said filters, said receiver receiving said delayed signals at only one of said inputs.

* * * * *